United States Patent
MacCleery et al.

(10) Patent No.: US 10,374,456 B2
(45) Date of Patent: Aug. 6, 2019

(54) TIME-LOCKED DATA ALIGNMENT IN DISTRIBUTED EMBEDDED SYSTEMS

(71) Applicant: NATIONAL INSTRUMENTS CORPORATION, Austin, TX (US)

(72) Inventors: Brian C. MacCleery, Austin, TX (US); Todd J. Walter, Austin, TX (US); Burt D. Snover, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 15/716,108

(22) Filed: Sep. 26, 2017

(65) Prior Publication Data
US 2018/0090988 A1    Mar. 29, 2018

Related U.S. Application Data

(60) Provisional application No. 62/399,700, filed on Sep. 26, 2016.

(51) Int. Cl.
| | |
|---|---|
| *H02J 3/24* | (2006.01) |
| *H02J 13/00* | (2006.01) |
| *G05B 19/042* | (2006.01) |
| *H02J 3/40* | (2006.01) |
| *H02J 3/38* | (2006.01) |

(52) U.S. Cl.
CPC ...... *H02J 13/0017* (2013.01); *G05B 19/0423* (2013.01); *H02J 3/24* (2013.01); *H02J 3/40* (2013.01); *H02J 13/0006* (2013.01); *G05B 2219/25232* (2013.01); *G05B 2219/25474* (2013.01); *H02J 3/383* (2013.01); *H02J 3/386* (2013.01); *Y02E 10/563* (2013.01); *Y02E 10/763* (2013.01); *Y02E 40/72* (2013.01); *Y04S 10/123* (2013.01)

(58) Field of Classification Search
CPC .......................... H02J 13/0017; G05B 19/0423
See application file for complete search history.

(56) References Cited

U.S. PATENT DOCUMENTS

| | | | |
|---|---|---|---|
| 8,957,666 B2 | 2/2015 | Dong et al. | |
| 9,332,072 B2 | 5/2016 | Hui et al. | |
| (Continued) | | | |

*Primary Examiner* — Vincent H Tran
(74) *Attorney, Agent, or Firm* — Meyertons Hood Kivlin Kowert and Goetzel PC; Jeffrey C. Hood

(57) ABSTRACT

An embedded system may distribute, e.g. at the point of coupling to a main power grid, information corresponding to one or more operational parameters (e.g. phase angle, frequency, amplitude, etc.) of a power delivery device to other power delivery devices, using a deterministic communication link. Updates of some or all of the information may be transmitted at future or past points in time, for example at defined time intervals. Time synchronization methods, e.g. a locked instantaneous interpolation mechanism may be used to create a coordinated time, shared among all power delivery devices. Various operating parameter mismatches, e.g. a phase mismatch between power delivery devices delivering power to the power grid, may thereby be reduced to less than a specified, negligible value. This creates tight time synchronization between the power delivery devices and allows them to interoperate in a manner that stabilizes rather than destabilizes the power grid.

20 Claims, 6 Drawing Sheets

Communication and Time Synchronization Link Mechanisms

(56) References Cited

U.S. PATENT DOCUMENTS

| | | | |
|---|---|---|---|
| 2005/0073783 A1* | 4/2005 | Luo | H02M 7/493 361/62 |
| 2013/0116844 A1 | 5/2013 | McNally et al. | |
| 2014/0074311 A1* | 3/2014 | Kearns | H02J 3/38 700/297 |
| 2014/0119080 A1* | 5/2014 | Sakamoto | H02M 7/493 363/95 |
| 2015/0378380 A1* | 12/2015 | Slota | H02J 3/42 700/298 |
| 2016/0064935 A1* | 3/2016 | Gao | H02J 3/40 307/82 |
| 2016/0266559 A1 | 9/2016 | Shi et al. | |
| 2016/0329709 A1* | 11/2016 | Park | G05B 13/026 |
| 2017/0097380 A1 | 4/2017 | Pahlevaninezhad et al. | |
| 2017/0179876 A1* | 6/2017 | Freeman | H02S 40/32 |
| 2017/0214249 A1* | 7/2017 | Seeley | H02J 3/44 |
| 2017/0279280 A1 | 9/2017 | Shakeel et al. | |

* cited by examiner

*IEEE 802 standards that enable time synchronization and deterministic communication over standard Ethernet while maintaining interoperability with traditional "best effort" traffic.*

| Standard | Area | Title |
|---|---|---|
| IEEE 802.1ASrev, IEEE 1588 | Timing & Synchronization | Enhancements and Performance Improvements |
| IEEE 802.1Qbu & IEEE 802.3br | Forwarding and Queuing | Frame Preemption |
| IEEE 802.1Qbv | Forwarding and Queuing | Enhancements for Scheduled Traffic |
| IEEE 802.1Qca | Path Control and Reservation | Path Control and Reservation |
| IEEE 802.1Qcc | Central Configuration Method | Enhancements and Performance Improvements |
| IEEE 802.1Qci | Time Based Ingress Policing | Per-Stream Filtering and Policing |
| IEEE 802.1CB | Seamless Redundancy | Frame Replication & Elimination for Reliability |

FIG. 6

TIME-LOCKED DATA ALIGNMENT IN DISTRIBUTED EMBEDDED SYSTEMS

PRIORITY CLAIM

This application claims benefit of priority of U.S. Provisional Patent Application Ser. No. 62/399,700 titled "Time-Locked Data Alignment in Distributed Embedded Systems", filed on Sep. 26, 2016, which is hereby incorporated by reference as though fully and completely set forth herein.

FIELD OF THE INVENTION

The present invention relates to the field of instrumentation and control, and more particularly to time alignment of data and information in distributed control systems and embedded systems.

DESCRIPTION OF THE RELATED ART

In many industrial applications (and others), instruments collect data or information from an environment or unit under test (UUT), analyze and process acquired data, and may also transmit data/control information to operate various electrical control systems. The information that may be collected and/or transmitted by respective instruments includes information describing voltage and current (amplitude, phase and frequency), resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to a host computer system. Various data acquisition and control systems are also used in real-time test systems.

One of the many applications in which such instruments are widely utilized is power electronics, which represents the application of solid-state electronics to the control and conversion of electric power and electromechanical machinery. Power electronics has been the subject of research in electronic and electrical engineering in the design, control, computation and integration of nonlinear, time-varying energy-processing electronic systems with fast dynamics. The popularity of power electronics and power electronics systems has greatly increased with ever more interest in alternate sources of energy (e.g. solar and wind) to more traditional power generating means (such as coal fired power plants, for example). Overall, the applications of power electronics range in size from a switched-mode power supply in AC (alternating current) adapters, battery chargers, audio amplifiers, fluorescent lamp ballasts, to name a few, through variable frequency drives and DC motor drives used to operate pumps, fans, and manufacturing machinery, all the way up to gigawatt-scale high voltage direct current power transmission systems used to interconnect electrical power grids. Applications can also include grid tied inverters, energy storage systems, industrial power supplies, vehicle traction systems, to name a few.

The coupling of various sophisticated instruments and components with various forms of power electronics led to the development of what is referred to as a "smart grid", encompassing a modernized electrical grid that incorporates the use of modern computer and communications technology to gather information about the behaviors of suppliers and consumers in an automated fashion, and provide interactive control based on the collected information to improve the efficiency, reliability, economics, and sustainability of the production and distribution of electricity.

Power electronic devices (or power electronics) are utilized in wind power systems to convert the generated ac voltages into direct current, which can be more easily converted into three phase power that is coherent with the power associated with any existing power grid. Electric power can also be generated through photovoltaic cells (or solar cells) by using power electronic devices. The produced DC (direct current) power usually goes through a DC-to-DC conversion stage before being converted to AC power, e.g. a three-phase current, through the use of inverters and/or any other type of suitable power converter. Typically, multiple modules are used within a photovoltaic system, as the system requires these converters on both DC and AC terminals.

Power electronics are thus used to adapt utilities to the rapid increase in distributed residential/commercial alternate power generation. However, managing a distributed control infrastructure to monitor and manage the flow of power, and more generally, managing distributed systems (e.g. control systems and/or embedded systems) coupling to a common bus poses unique challenges in maintaining proper system synchronization.

Other corresponding issues related to the prior art will become apparent to one skilled in the art after comparing such prior art with the present invention as described herein.

SUMMARY OF THE INVENTION

Universal access to electricity is provided primarily by an electric power grid. The primary source of electrical production, or power today is through the use of synchronous generators. Meanwhile, a fundamental change in energy technology has taken place. Various new technologies have not only made renewable energy sources (or renewables, for short) possible, they have also made renewables some of the lowest costing sources of energy on the grid. Renewables now account for a large portion of the new energy installed on the grid. Unlike the spinning synchronous generators, which naturally help stabilize the voltage and frequency of the grid, renewables use electronic power inverters with electronic control systems, together referred to as power electronics. Power electronics are being used in all of the innovative new energy systems, from renewables and energy storage systems to electric vehicles. According to some estimates, in the near future, about 80 percent of all power will be delivered through/by power electronics systems. However, the interaction between synchronous generator based grids and power electronics based power converters can cause problems.

There exists a number of control problems that arise related to stability, power quality and energy efficiency in power grids with a high-penetration of power electronics. New control technologies are therefore needed. Conventional control algorithms limit the amount of renewable energy that can be used. A majority of the power must be produced by traditional fossil fuel based power generators. In high penetration power electronics installations there is a lot of uncertainty in the phase and frequency of the grid. Each inverter (the primary output device of power electronics power delivery devices) is disturbing the same voltage and frequency that it is trying to track (or lock to), and can also produce harmonics which make it more difficult for adjacent power converters to correctly track the phase angle and frequency of the grid. In a way, this results in the devices attempting to "compete" or "fight" with each other, which reduces the stability of the grid, as well as the quality of the delivered power, and results in reduced energy efficiency due to unintentional energy exchange.

Despite the problems described above, there is nothing inherent in renewables or the power inverters used in delivering power from renewables which prevents them from helping stabilize the grid voltage and frequency. However, the present rules and standards that govern how power electronics deliver power on the grid were drafted with the assumption that renewables would represent only a small percentage of the total delivered power. Thus, as the grid presently operates, the variable amount of current available from the renewable source is most often simply injected into the grid, without actively regulating grid voltage and frequency using closed loop control algorithms. In many cases, pre-computed curves are used to adjust real and reactive power output in response to grid voltage and frequency, but such open loop methods are limited in their effectiveness. Meanwhile, there are regions where it is becoming more and more desirable to provide the majority of power using power electronics, from sources like wind and solar. When power electronics produce a large portion of the electricity in a grid, it becomes vital for the inverters to help to actively stabilize the voltage and frequency of that grid in a manner that provides fast response to changing dynamic conditions.

The problem with conventional control systems for grid tied inverters is that each inverter tries to lock on to the grid voltage and produce variable amount of current that is in phase with the grid voltage. However, those same inverters tend to distort those grid voltage sine waves. As more and more power electronics inverters are connected onto a local power grid, the voltage becomes more and more distorted, making it harder for those inverters to correctly lock on and assess the proper angle of the grid voltage. Many of the problems with the grid stability are related to the uncertainty of the phase angle calculation and the fact that the inverters are injecting current in proportion to the variable amount of renewable energy available without actively regulating the grid voltage and frequency. However, new control technologies, (enabled by new internet technologies, for example) may be devised to provide grid stabilization through voltage and frequency regulation implemented with the use of power electronics inverters. In some embodiments, new control techniques may use Ethernet Time Sensitive Networking (or TSN, for short) standards for performing control of the power electronics inverters (also simply referred to as inverters, for short). By changing the way the inverters are controlled, the grid stability may actually be increased as the percentage of total power delivered to the grid by power electronics (or inverters) from renewable energy sources increases. This is in contrast to the decline in grid stability that is created with the increase of the percentage of total power delivered to the grid by power electronics when using conventional, commonly used grid interconnection standards and control systems.

A key problem, addressed by various embodiments disclosed herein, is how to phase lock such inverters, or more generally how to time lock the operation of the power electronics power delivery devices and synchronize their control to provide stable voltage and frequency when there are no big generators, such as a diesel generator set or coal fire power plant to provide active voltage and frequency regulation and a stable reference for the power electronics power delivery devices to follow.

Various embodiments disclosed herein provide a new way of time synchronizing the control operation of distributed control systems/embedded systems, e.g. inverters or power delivery devices or embedded systems included in the power delivery devices, which allows the coordination of the control of the distributed systems power delivery devices, eliminating any contention between the devices and the devices attempting to "compete" or "fight" with each other. Various embodiments of control technologies described herein facilitate the addition of increasing numbers of power electronics power delivery devices to the grid (power delivery system) causing the system to actually become increasingly more resilient, robust and stable, as opposed to more and more unreliable and less stable as more power converted control systems are added. Rather than detracting from stability and power quality, power electronics converters (or power electronics power delivery devices) can thereby play a significant role in the improvement of the electrical grid. The coordination of the power delivery devices may include aligning the phase angle between any or all of the power delivery devices tied to the grid, via TSN, which is more accurate than phase locking to the measured grid voltages. This facilitates all of the controlled power delivery devices (e.g. inverters) tied to the power grid being able to share and agree upon the phase angle over their respective TSN connections. In this manner, each power delivery device (e.g. inverter) may assist in regulating and stabilizing the voltage and frequency of the power grid. Consequently, as more energy sources that use power electronics inverters to deliver their power onto the grid are added, the stability and robustness of the grid actually increases rather than decreases. Furthermore, the real-time communication links between the power delivery devices (e.g. inverters) may be used to balance the supply and the demand of energy as required, even over long distances. This makes it possible to easily provide 100% of the delivered power from renewable sources, as these new sources of energy stabilize rather than destabilize the power grid, while also balancing supply and demand.

In some embodiments, an embedded system—e.g. included in a power electronics power delivery device such as a power electronics inverter—may distribute, e.g. at the point of coupling to the main grid, pertinent information corresponding to one or more operational parameters of the power delivery device (e.g. the phase angle, frequency, amplitude, or other information) to all of the power delivery devices, using deterministic communication over an appropriate communication link, e.g. over Ethernet Time Sensitive Network (TSN). An update of some or all of the information may be transmitted at future or past points in time, which may occur based on a defined time interval, e.g. every millisecond. It should be noted that updates may also be sent in "past" points in time as it's also possible to use backward interpolation in time, since in some cases, such as an islanded microgrid, a goal is to have all control systems synchronized, therefore both forward and backward methods may be used to fill in the gaps between communication updates in a precisely time aligned way. However, updates for the purposes of tracking the information across the distributed embedded systems may be transmitted at any desired time or time period or defined time interval(s). Time synchronization methods may then be used to create a coordinated, shared time between the devices (e.g. implemented on an FPGA, or "servoing" independent oscillators) that is shared among the power delivery devices. By doing so, various operating parameter mismatches between the distributed embedded systems, e.g. a phase mismatch between the power delivery devices on the power bus (grid) to which the power delivery devices are delivering power may be reduced to less than a specified value, e.g. +/−100 billionth of a second. This creates a tight (time) synchronization between the power delivery devices and allows the power delivery devices to interoperate in a manner that stabilizes the grid rather than causing the different power delivery devices (or power electronics power delivery devices) to operate in contention with each other.

Maintaining such tight synchronization also allows disconnecting any number of the distributed devices/systems from the main grid and sourcing all power from renewable energy sources and battery storage power, while maintaining high stability and dynamic balancing of power delivery. When a subsection of the grid is disconnected from the main grid, it is typically referred to as an "islanded microgrid". It should also be noted that the transmitted information, (e.g. phase angle information, which may be part of the information corresponding to time-locked phase alignment information) may originate from any designated or presently used source. Thus, should the grid experience an outage, the information wouldn't represent the external grid phase, but could be used to realign to the grid when the grid becomes operational again, enabling seamless realignment and reconnection.

It should also be noted that under certain conditions power electronics power delivery devices may actually absorb electric power. An energy storage system, for example, may absorb power while charging, and deliver power while discharging. In addition, four-quadrant motor drives with active front-ends may also charge and discharge during operation. For example, when the motor is decelerating, the mechanical energy is transformed into electrical power transferred to the grid (also known as regenerative braking). Digitally phase locking the power electronics power delivery devices yields much higher precision than what is achievable by phase locking to physical voltage waveforms. Load sharing is greatly enhanced, and more than one power delivery device may be operated in voltage and frequency regulation mode. This allows for hard starting a sizeable industrial load, for example, without experiencing local stability problems. In addition, the power electronics power delivery devices and islanded microgrids may be synchronized with the main grid and may connect or disconnect on the fly from the grid without shutting down or having to rely on time consuming resynchronization methods.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which:

FIG. 6 shows a table listing various IEEE standards that may be used for establishing a time sensitive networking connection between power delivery devices.

Figure 1:
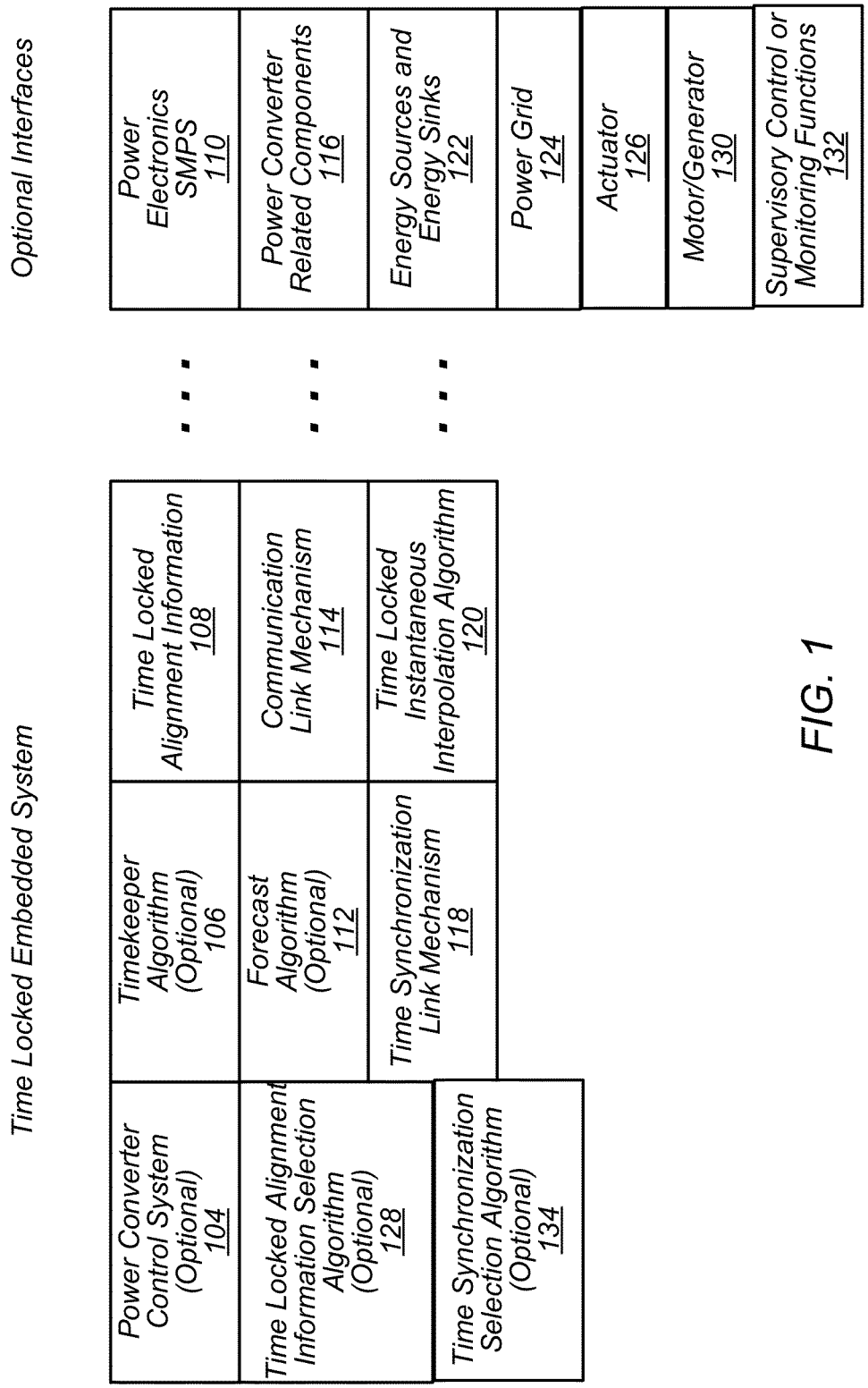
FIG. 1 shows a block diagram illustrating exemplary system components and interfaces used for time synchronizing distributed control systems, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

It is noted that the various terms or designations for circuits/components and signals as they appear herein, for example in such expressions as "switching circuit", "delay circuit", "source signal", "stimulus signal", etc. are merely names or identifiers used to distinguish among the different circuits/components and/or between different signals, and these terms are not intended to connote any specific meaning, unless directly indicated otherwise.

Various embodiments disclosed herein may be used in at least improved power distribution systems that include a wide variety of power delivery means and/or power delivery devices. For example, various embodiments may be used in power distribution systems that include power delivery devices associated with traditional electro-mechanical power sources (e.g. coal fired plant with power delivered to the grid by synchronous generators) as well as more modern power sources (e.g. solar panels and wind, with power delivered to the grid by power electronics converters). In some embodiments, the power delivery devices may be implemented as power electronics inverters interconnected by a time sensitive networking connection, delivering power from renewable energy sources and/or other alternative energy sources onto a 3-phase microgrid. The 3-phase microgrid may also be coupled to a 3-phase main grid connecting to synchronous generators delivering power to the main grid from conventional energy sources.

Overview

Figure 2:
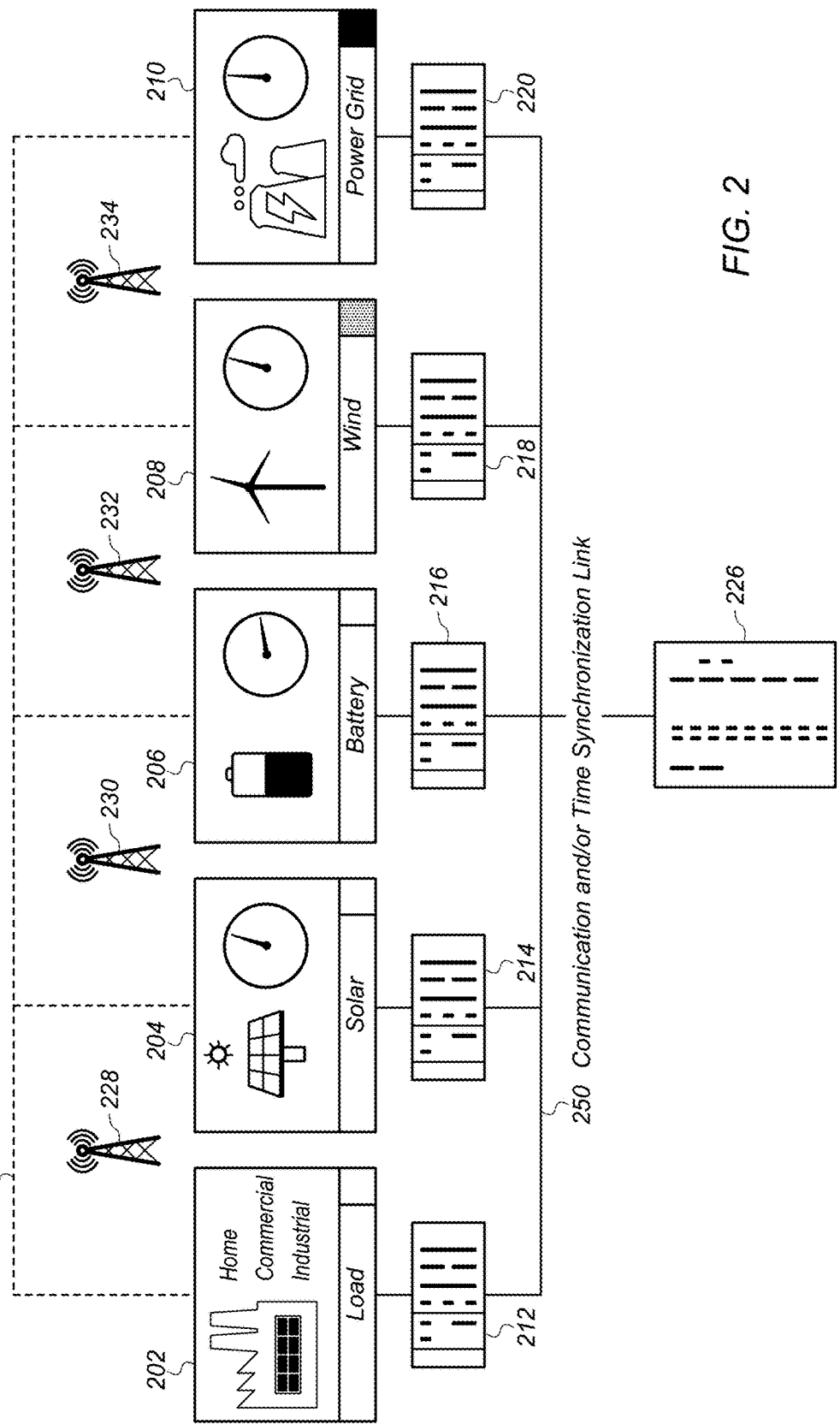
FIG. 2 shows the system diagram of an exemplary time synchronized power distribution system that includes various different power delivery devices associated with respective power sources and corresponding control instrumentation, according to some embodiments.
Figure 4:
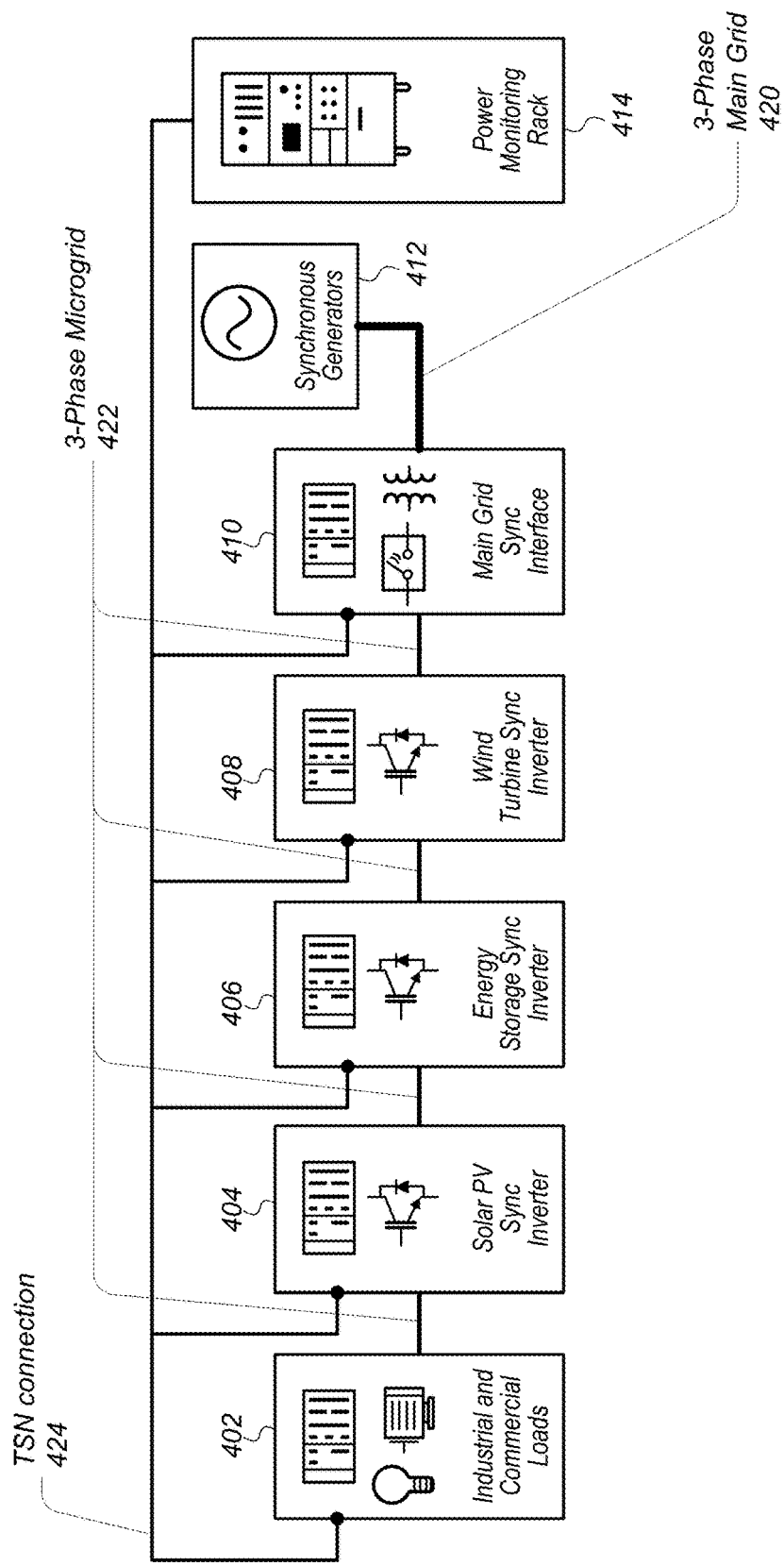
FIG. 4 shows the system diagram of an exemplary time synchronized power distribution system that includes various different power electronics inverters associated with respective power sources and corresponding control instrumentation, according to some embodiments.

FIG. 1 shows a block diagram illustrating exemplary system components and interfaces that may be used for time synchronizing distributed control systems, according to some embodiments. Overall, a number of (distributed) embedded systems or embedded control devices may be time-locked to each other in order to synchronize operation of the devices, allowing reliable and efficient system operation. One example is a power delivery system, exemplary embodiments of which are shown in FIG. 2, and FIG. 4, which will be described in detail below. In general, the time-locked embedded system may operate by having at least one device transmit time-locked alignment information (108) to one or more other devices which are to be synchronized with each other. The information may be provided over a chosen communication link mechanism (114), which may encompass various wireless and/or wired communication channels and/or standards. The devices may use a time-locked instantaneous interpolation mechanism/algorithm (120) and a time synchronization link mechanism (118) to operate in sync with respect to each other, allowing accurate and precise tracking to various common variables/characteristics. For example, in case of a power delivery system (which represents one application), the power delivery devices may accurately track to desired amplitude, phase and frequency values as provided by one (or more) of the devices to any of the other devices in a time synchronized manner.

The devices may further fine tune their operation using any one or more of a timekeeper mechanism (106), forecast mechanism (112), time-locked alignment information selection mechanism (120) or time synchronization selection mechanism (121). In case of a power delivery system, the devices may include power delivery devices and also use a power converter control system (104), The embedded systems/devices may also include one or more interfaces to interface with various operational or functional circuitry/systems which may thereby by time synchronized and controlled. Such interfaces may include but are not limited to interfaces to power electronics [switched mode power supply] (110), power converter related components (116), energy sources and energy sinks (122), power grid (124), actuators [for applications such as robotics and motion control, etc.] (126), motors/generators (130) or supervisory control or monitoring functions (132).

Exemplary System

FIG. 2 illustrates an exemplary power delivery system that shows various contemporary power delivery devices associated with more modern, electric power generating/sourcing delivery means (solar, wind, battery). The power delivery system is coupling to a grid that may also include more traditional power sourcing/generating means (e.g. coal fueled power plants, etc.), as represented by block 210. Each power delivery device (204, 206, 208, and 210) may include control circuitry or control system for controlling the delivery of the power provided through the respective power delivery device to the common power bus or power grid, represented as physical power network 260. The physical power network may be a three-phase bus with transmission/distribution lines, for example. The system also includes a load 202 representing devices or customers connecting to the power grid/power bus 260 to receive and consume power provided by the power delivery system. It should be noted that each power delivery device shown may be considered as exemplary and collectively representing one or more power delivery devices delivering power sourced by the indicated method. Furthermore, as also previously noted, devices broadly referred to herein as "power delivery devices" may, at times—depending on the given operating conditions—sink power, while at other times they may be delivering power. E.g. power delivery device 204 represents one or more power delivery devices sourcing power from solar panels, power delivery device 206 represents one or more power delivery devices sourcing power from battery backups, power delivery device 208 represents one or more power delivery devices sourcing power from windmills, etc. As also shown in FIG. 2, the power delivery devices may each be controlled by a respective one of embedded control devices/systems/circuits 212, 214, 216, 218, and 220. The time synchronization of the devices may be achieved via communication and/or time synchronization link 250 coupling the devices 212, 214, 216, 218, and 220 together as shown. The system may further include a central control/server device 226, which may also be used to communicate information to devices 212, 214, 216, 218, and 220.

Communication and Time Synchronization

Figure 3:
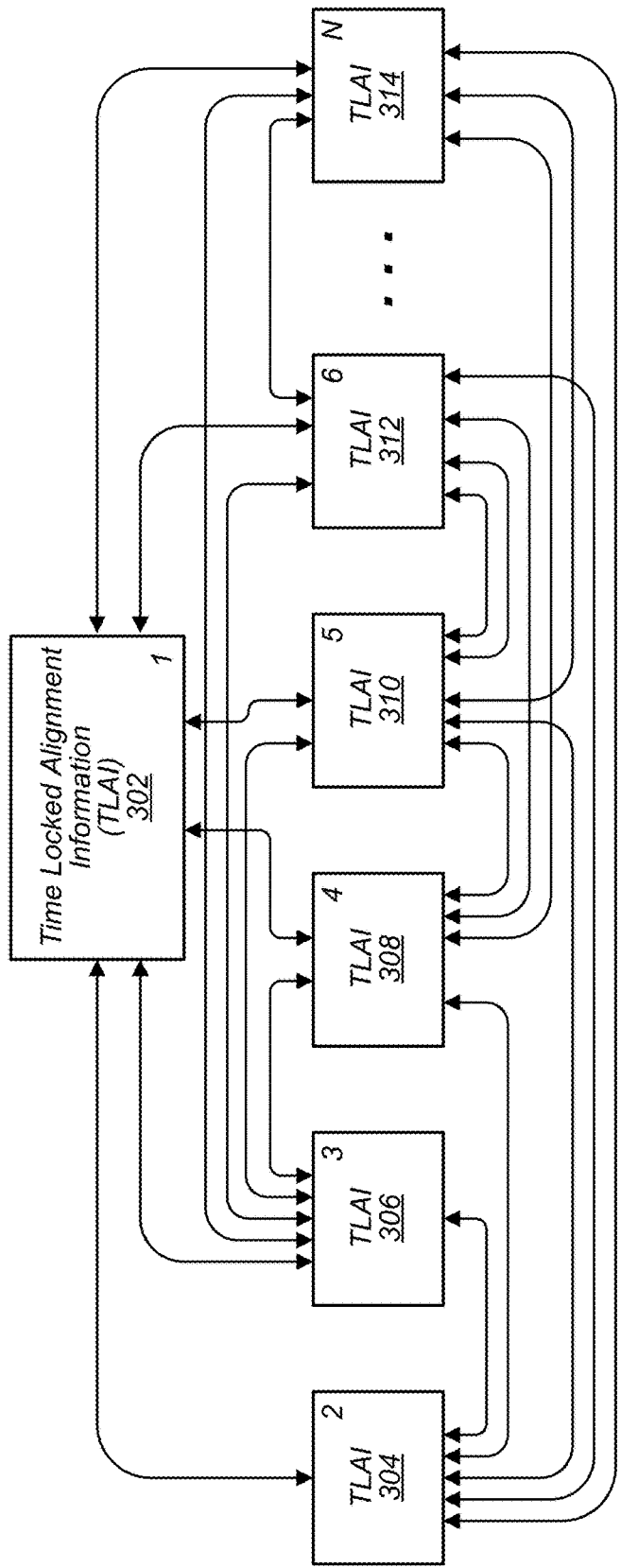
FIG. 3 shows the system diagram of an exemplary control mechanism used to time synchronize distributed systems, according to some embodiments.

FIG. 3 illustrates the interconnectivity of various distributed systems and/or devices, which may be distributed embedded systems, for example. In some embodiments, the distributed embedded systems may be control systems associated with power delivery and/or power delivery devices, for example. In some embodiments the power delivery devices may include the embedded control system and/or distributed device(s) 302, 304, 306, 308, 310, 312 to 314 illustrated in FIG. 3. Information corresponding to various operating parameters of systems/circuits/devices associated with the distributed embedded control systems/devices 302, 304, 306, 308, 310, 312 to 314 may be communicated between devices 302, 304, 306, 308, 310, 312 to 314 via the illustrated links. For example, in this manner, time-locked alignment information, such as time-locked phase alignment information may be communicated between power delivery devices, e.g. between power delivery devices associated with and/or coupled to and/or containing devices such as shown in FIG. 3, e.g. the power delivery devices shown in FIG. 2. As shown in FIG. 3, the time-locked alignment information, or more generally any useful information and/or control data, signals, values, parameters, etc. may be sourced by any of the embedded system or embedded control devices, and delivered to any one or more of the remaining embedded (control) devices. For example, the information may be sourced by device 308 and delivered to all the other devices, or delivered only to devices 310 and 306, and so on and so forth.

Accurate Control of Power Delivery Devices in a Power Delivery System

Accordingly, in one set of embodiments, in order to accurately perform network coordinated control of power delivery devices (which may be considered power converters in their functionality of converting sourced mechanical, heat or light energy into deliverable current at associated power line/grid voltage levels), control information, which may include time-locked alignment information (or time alignment information or time synchronization information) may be periodically transmitted between two or more power delivery devices. The power delivery devices may include control systems which—in various disclosed embodiments—may be referred to as "Time-locked Embedded System(s)" by virtue of their interoperation facilitated by the transmitted and received time-locked alignment information.

"Time-locked Embedded Systems" may be defined as two or more embedded systems that share a "time-locked" counter, time base, and/or clock. Generally, there may be an "epoch" or some global time reference that is shared among the embedded systems. The "Time-locked Embedded Systems" may be located in different places or they may be collocated. One or more "Communication Link Mechanisms" may be utilized for communication purposes and one or more "Time Synchronization Link Mechanisms" may be utilized for time synchronization purposes. In other words, the time-locked alignment information (e.g. phase or any other useful control information) may be transmitted and received by the power delivery devices over one or more different types of communication links as will be further described below. In addition, multiple time synchronization link mechanisms are possible and are contemplated, as will also be further disclosed below.

The "Communication Link Mechanism" and the "Time Synchronization Link Mechanism" may be wired (i.e. serial link, copper or fiber Ethernet, etc.) or wireless (i.e. radio frequency, wireless Ethernet, light, sound, etc.) or may be provided over power lines or other communication channels. One or more "Time-locked Instantaneous Interpolation" algorithms may be utilized to calculate time-locked instantaneous interpolated values as used for local control. The time-locked instantaneous interpolated values may provide interpolated instantaneous "Time-locked Alignment Information" used for local control at certain times when "Time-locked Alignment Information" is not received via the "Communication Link Mechanism". For example, first "Time-locked Alignment Information" may be received at a first point in time and second "Time-locked Alignment Information" may be received at a second point in time. Between the first and second points in time, one or more instantaneous "Time-locked Alignment Information" (values), obtained based on the first and second received "Time-locked Alignment Information" through one or more interpolation algorithms, may be used for performing local control until a next transmitted "Time-locked Alignment Information" is received via the "Communication Link Mechanism". In some embodiments, "Time-locked Alignment Information" may include, but may not be limited to, one or more of the following data elements: phase angle, frequency, amplitude, timestamp, packet identifier, and/or error-detecting code.

Timekeeper Mechanism

As previously mentioned, embedded systems included in power electronics power delivery devices may be time-locked to yield a power delivery system that includes "Time-locked Embedded Systems." For example, optionally, a "Timekeeper Mechanism" may be used which provides a time synchronized counter which is aligned in time and phase (e.g. it is "time-locked") among the embedded systems, such that phase and time alignment is achieved in between communication updates, even if the embedded systems are located remotely relative to one another, and even if the embedded systems only occasionally communicate. In some embodiments the timekeeper mechanism may be an algorithm executed by a suitable processing element, or it may be partially implemented with application specific hardware components, or it may be implemented in programmable hardware (e.g. a field programmable gate array), or it may be implemented as a combination of any one or more of those elements.

In some embodiments, the "Timekeeper Mechanism" may be used to calculate a "Master Time Value" which may be referenced to a specified start time (or specified point in time) known to each "Time-locked Embedded System" and/or a "Relative Time Value" which may be referenced to the start of a periodic time interval "Time Event," such that the start time of the periodic time interval is known to each of the "Time-locked Embedded Systems."

Forecast Mechanism

Optionally, a "Forecast Mechanism" may be used to calculate local "Time-locked Alignment Information" and estimate the "Time-locked Alignment Information" at the current (or present) time (or point in time), at a future or past time (or point in time), and/or at a past time (or point in time).

Estimation of the current, future or past "Time-locked Alignment Information" may be calculated locally by the "talker(s)" (transmitters) or calculated remotely by the "listener(s)" (receivers) of the "Time-locked Alignment Information" information or by both the "talker(s)" and the "listener(s)". Each "listener" may also be a "talker" and vice versa. In some embodiments, the timing of the calculation of the "Time-locked Alignment Information" and the timing of the sending (transmitting) of the "Time-locked Alignment Information" may be scheduled to occur at a programmable "Relative Time Value."

Communication Link Mechanism

A "Communication Link Mechanism" may be provided for transmitting (sending, "talking") the estimated present, future or past "Time-locked Alignment Information" from one or more embedded system (or power delivery devices) "talker(s)" and receiving it at one or more embedded system (or power delivery device) "listener(s)." For example, the "Time-locked Alignment Information" may be communicated directly between embedded systems, routed through network infrastructure such as switches, cabling, etc., sent over physical media such as power lines, or using wireless communication mechanisms such as radio frequency signals, light, sound, etc.

The "Time-locked Alignment Information" may be communicated in a peer-to-peer, multicast or other manner including mechanisms such as data sharing, publish-subscribe, or request-reply methods. In some embodiments, the "Time-locked Alignment Information" may be transmitted over a real-time Ethernet communication network link such that, ideally, the information arrives at the listeners before the start of the next periodic "Time Event."

Time-Locked Instantaneous Interpolation

One or more "Time-locked Instantaneous Interpolation" algorithms may be executed on one or more "Time-locked Embedded Systems" which receive the "Time-locked Alignment Information", and use a local timebase value(s)—which are time synchronized among the embedded systems (e.g. via use of a "Timekeeper Mechanism")—to calculate time-locked instantaneous interpolated "Time-locked Alignment Information" values. These time-locked instantaneous interpolated values may then be used for performing control operations. For example, an energy phase reference may be determined and/or targeted according to received "Time-locked Alignment Information" and based on the synchronized time. In some embodiments, executing the Time-locked Instantaneous Interpolation algorithm may include latching the "Time-locked Alignment Information" at a programmable "Relative Time Value." In other words, the receiving and latching of the "Time-locked Alignment Information" may be scheduled to occur at a programmable relative point in time within a shared periodic cycle.

Time-Locked Embedded Systems and Additional Power Delivery Device Components

In some embodiments, various components of power delivery devices may be collocated or may be located separately. For example, each "Time-locked Embedded System" may or may not include a local "Power Converter Control System" and may or may not directly interface to "Power Electronics" or "Switched Mode Power Supply" (SMPS) devices (i.e. IGBT, MOSFET, SiC, GaN) or sub-assemblies (i.e. power modules, power stacks, inverters, converters, power electronics subsystems). Furthermore, each "Time-locked Embedded System" may or may not interface to other "Power Converter Related Components" (i.e. power supplies, sensors, fuses, contactors, bus bars, cables, connectors, power lines, capacitors, inductors, resistors, insulators, transformers, line reactor filters, EMI filters, safety components, disconnect switches, human machine interface, buttons/switches/lights, cabinets), and may or may not interface to "Sources and Sinks of Energy" (i.e. electrical, mechanical or chemical sources and sinks, DC links, motors, generators, solar panels, turbines, batteries, etc.). Finally, the "Time-locked Embedded System" may or may not interface to one or more "Power Grids" (i.e. distribution networks, transmission networks, single phase, three phase, etc.), and may or may not interface to one or more "Other Systems".

Power Grid with Power Electronics Sync Inverters

FIG. 4 shows the system diagram of an exemplary time synchronized power distribution system that includes various different power electronics inverters associated with respective power sources and corresponding control instrumentation, according to some embodiments. In the exemplary system shown in FIG. 4, various power electronics inverters 404, 406, and 408 are delivering power from solar, battery, and wind sources, respectively. The power electronics inverters 404, 406, and 408 (or sync inverters, for short) are delivering power to a 3-phase microgrid 422, which is coupled to various loads represented by block 402. The microgrid also couples to a 3-phase main grid 420 via a main grid sync interface 410. Main grid 420 may also receive power originating from more conventional sources, exemplified by synchronous generators 412. The entire power delivery system may be monitored from TSN switch and power monitoring station 414. The load(s) 402 and sync inverters 404, 406, and 408, as well as monitoring station 414 may be interconnected via a TSN connection for performing control and monitoring according to the principles described above.

The grid-tied inverters 404, 406, and 408 actively stabilize (rather than destabilize) the microgrid 422, and also main grid 420 via main grid interface 410 by actively regulating voltage and frequency, rather than simply injecting current without regard to grid stability. After a disconnection, islanded microgrid sections may be reconnected reliably and without risk or delays by automatically aligning phase and amplitude between sync inverters 404, 406, and 408. The supply from renewable energy sources may be automatically matched to demand, even over long distances (e.g. by using fiber optic Ethernet links), faster than sags/swells and frequency disturbances propagate through power lines. The unintended circulating currents between inverters in high penetration applications may be eliminated compared to about 5% of rated power circulating when using conventional field oriented control in the allowed case of 8% voltage total harmonic distortion (THD). This results in higher energy efficiency with improved control stability gain and phase margins. Pulse Width Modulation may also interleaved to reduce THD. Forced manual curtailment of renewable energy production by operators due to the risk of over/under-supply issues is thereby reduced, allowing a higher percentage of power generation to come from renewable energy sources, all the way up to 100 percent. The amount of spinning reserve generation required to offset the destabilizing effect of present day (prior art) source inverters may also be reduced. The need for such spinning reserves has the unfortunate effect of mitigating the environmental benefits of renewable energy production in most present day systems. The lifetime of power electronics transistors may be actively managed by the control application running on the sync inverter and/or running on monitoring station 414. This facilitates OEM equipment manufacturers' reducing the risk of pre-mature failures resulting in unexpected warranty recalls. While the disclosed exemplary Sync Inverter implementation uses Ethernet TSN as the communication mechanism (see FIG. 6, which shows a table listing various IEEE standards that may be used for establishing time sensitive networking connections), other embodiments are possible and are not limited to using Ethernet TSN as the communication mechanism of choice.

As shown in FIG. 4, load power requirements for loads 402 may be monitored and forecast to optimize operations. Non-critical loads may be shed during emergencies. Inverter phase, frequency and amplitude may be synchronized via the TSN connection 424 to eliminate instabilities and unintended circulating currents. Inverters 404, 406, and 408 may be grid forming and may actively stabilize the power grid (422 and 420), obviating the need for synchronous generators which may nonetheless still be coupled to the main grid 420 (exemplified by synchronous generators 412), to deliver power from conventional sources, but the inverters 404, 406, and 408 have the capability of stabilizing the grid. Virtual synchronous machine and robust droop control algorithms may enable load sharing and synchronized grid forming operations with or without the Ethernet TSN network. Main grid phase, frequency, amplitude and power demand requirements may be shared with sync inverters 404, 406, and 408 over TSN connection 424, which may be an Ethernet TSN connection. Instantaneous reconnection to main grid 420 may be enabled by keeping islanded microgrids (such as microgrid 422) synchronized.

In some embodiments, a phase relationship between inverters 404, 406, and 408 may be maintained using timestamps with phase information, and with the control system within the inverter using a non-aligned clock to sample the predicted control signal used for performing the control. Furthermore, inverters 404, 406, and 408 may transmit/receive updates of phase and precise time stamps, and maintaining the phase interpolation to predict a future or past state. Thus, inverters 404, 406, and 408 may transmit/receive updates of "Time-locked Alignment Information" at future or past points in time, and/or transmit/receive precisely timestamped history that enables predictive algorithms executed by inverters 404, 406, and 408 to supply future or past targeted phase state information based on time.

FIG. 5

Figure 5:
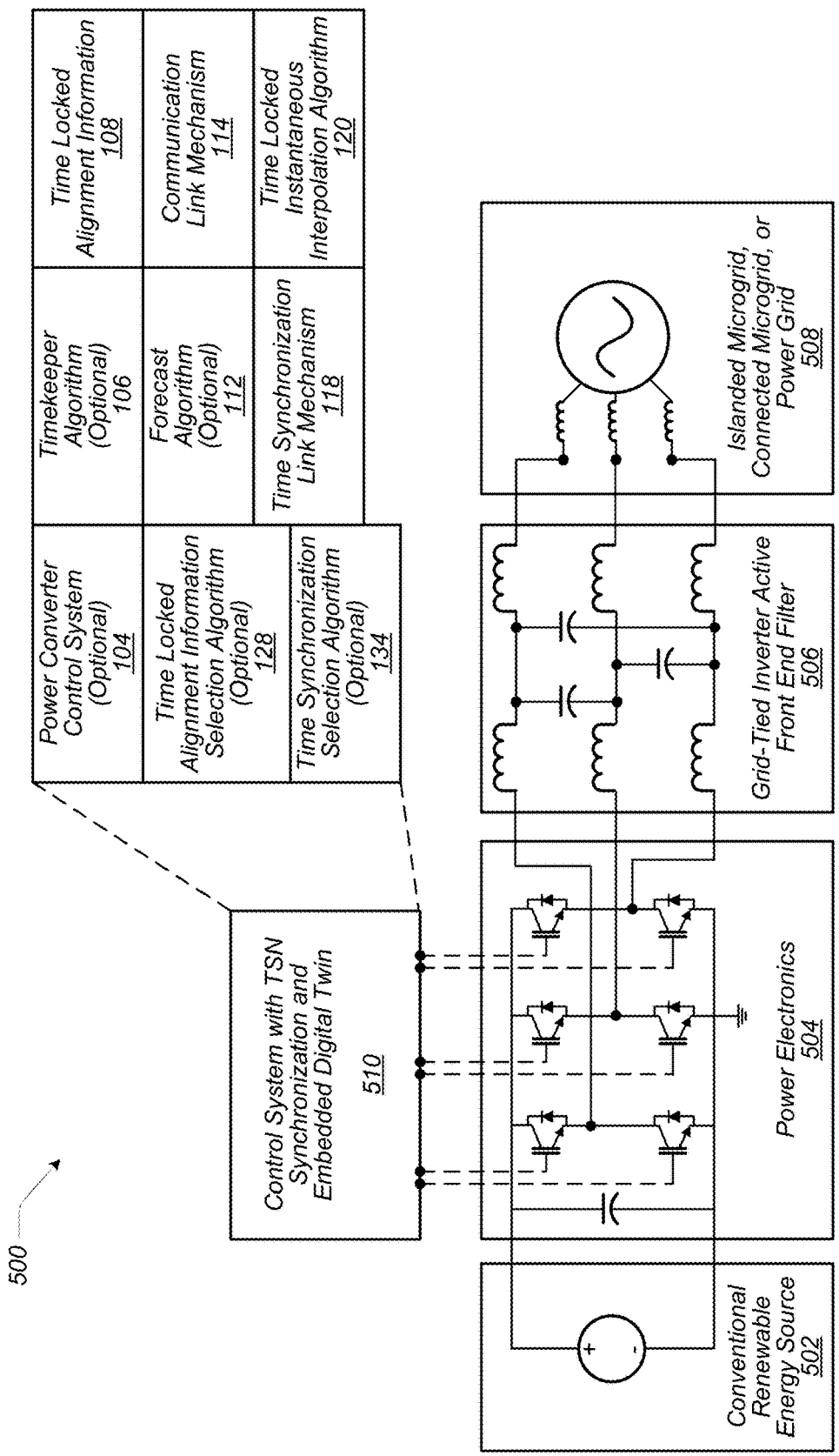
FIG. 5 shows the circuit diagram of an exemplary embodiment of a power electronics inverter and its respective connections to a corresponding energy source and a power grid.

FIG. 5 shows the circuit diagram 500 of an exemplary embodiment of a power electronics inverter and its respective connections to a corresponding energy source and a power grid. Power electronics 504 and active front end filter(s) 506 may be part of a sync inverter, such as sync inverters 404, 406, and 408 illustrated in FIG. 4. The sync inverter may further include a control system 510, which may implement TSN synchronization features, such as those previously described above. Accordingly, control system 510 may include one or more specific functions/algorithm/control mechanisms that allow the sync inverter to contribute to stabilization of the power grid while delivering power from alternative (e.g. renewable) energy sources. Examples of the functionality implemented by control system 510 include providing/receiving time-locked alignment information 108, a communication link mechanism 114, a time-locked instantaneous interpolation algorithm 120, power converter control 104, a time-locked alignment information selection algorithm 128, a time synchronization selection algorithm 134, a timekeeper algorithm 106, a forecast algorithm 112, and a time synchronization link mechanism 118.

In the exemplary system 500, power electronics 504 module includes solid-state electronics circuitry to control and convert electric power sourced from conventional renewable energy source(s) 502. The conversion may be performed with semiconductor switching devices such as diodes, thyristors and transistors. In contrast to electronic systems concerned with transmission and processing of signals and data, in power electronics, substantial amounts of electrical energy are processed, with the power potentially ranging from a few hundred watts to tens of megawatts. Power electronics 504 may interface to a power grid 508 (e.g. an islanded microgrid, a connected microgrid, or a standard power grid) via a grid tied inverter active front end filter 506. Because inverters convert energy from a DC source to an AC output, both in a standalone mode or when connected to the utility grid, a filter is used between an inverter and the grid, imposing a current-like performance for feedback control and reducing harmonics of the output current. Such filters may be constructed from simple series inductor, though a higher-order LCL filter provides better performance by smoothing the output currents of the inverter, and achieving a higher attenuation along with cost savings, given the overall weight and size reduction of the components. Other filter designs are also possible, and the various embodiments of improved power delivery systems disclosed herein are not limited to those filter designs shown in FIG. 5 and discussed above.

It should also be noted that the expression "Embedded Digital Twin" appearing as a possible component of control system 510 is in reference to technology disclosed in U.S. Pat. No. 9,235,395 related to "Graphical Development and Deployment of Parallel Floating-Point Math Functionality on a System with Heterogeneous Hardware Components", and further disclosed in U.S. Pat. No. 9,652,213 related to "Global Optimization and Verification of CPS Using Floating Point Math Functionality on a System with Heterogeneous Hardware Components".

Optional Features:

In addition to the above, various embodiments of improved power delivery devices (or time-locked embedded systems) may feature error detection and correction to detect data that is received out of sequence (i.e. early or late) or is otherwise corrupted, and to provide a locally estimated phase angle and frequency at the future or past time event, thereby enabling the inverter to operate properly even if communication issues occur. In some embodiments, a time-locked embedded system may operate to compare a local phase locked loop (PLL) phase angle and frequency to the external phase angle and frequency information received from one or more "talkers" (transmitting time-locked embedded systems) and automatically select between the local value(s) and received value(s), thereby enabling the ability to fall back to conventional local control timing mechanisms.

In some embodiments, more than one of the power delivery devices (or time-locked embedded systems) may transmit frequency and phase angle information to other power delivery devices, and the devices receiving the frequency and phase angle information may select and agree upon one or more of the transmitting devices to follow or track through methods such as voting and Quality of Service (QoS) analysis.

In some embodiments, waveforms and/or control signals may be generated based on a global time synchronized counter which is shared between the time-locked embedded systems. Each time-locked embedded system may select or may be assigned a programmable offset or phase shift relative to the global time reference. The globally time-aligned signals may include control reference waveforms, e.g. control sine waveforms and/or control triangle waveforms.

In some embodiments, information (e.g. data) associated with various operating parameters of the power delivery devices (or time-locked embedded systems) may be transmitted between any of the power delivery devices, as illustrated for example in FIG. 2. While some of the devices may be designated as the "transmitters" and other devices may be designated as "receivers", the information may nevertheless be transmitted from and to any one or more of the devices. The information, or data may include frequency, phase, amplitude or other relevant information such as real current, reactive current, real power, reactive current, harmonics, etc. The information may be used by the power delivery devices for additional control coordination mechanisms such as load balancing/sharing, voltage/frequency support, low voltage ride through, anti-islanding, harmonic compensation/cancellation, etc.

In some embodiments, one or more of the power delivery devices may automatically compensate for phase delays between the power delivery devices, for example for phase delays due to geographic location and/or power line lengths. Furthermore, one or more of the power delivery devices may also automatically compensate for variations in local line reactor frequency dependent phase shifts and resonances stemming from operating conditions such as the output power level of an inverter (which may be part of the power delivery device or may otherwise be under the control of the power delivery device). In other embodiments, power delivery devices may compensate for or cancel the harmonic energy produced by other power delivery devices to improve the power quality at a third location or locations such as a load or point of common coupling. In yet other embodiments, power delivery or active filtering devices may compensate for high frequency resonant instabilities caused by the interaction of distributed energy resources that are interconnected using power lines of various lengths, impedances and resonant frequencies.

In some embodiments, the power delivery system may also include a converged Ethernet communication network between two or more of the power delivery devices, in which communication with bounded latency, reserved bandwidth and/or redundancy may co-exist with best effort traffic. The power delivery system may further feature TSN supporting features such as time synchronization, bandwidth reservation and path redundancy for reliability, guaranteed bounded latency, low latency data transfer (cut-though and preemption), high bandwidth (Gb+). Related Ethernet standards are shown in the table of FIG. 6 and include IEEE 802.1AS Time sync enhancements, IEEE 802.1Qbv: Scheduled traffic, IEEE 802.1Qbu: Frame pre-emption, IEEE 802.1CB: Seamless redundancy in data plane, IEEE 802.1Qca and Qcc: Control plane enhancements, IEEE 802.1Qbz and 802.11ak: Wireless bridging. The communications between various power delivery devices may also include improved cyber security including detection, resiliency and recovery in the face of cyber-attacks. For example, the power delivery devices may employ secure communication methods and protocols including authentication, and may utilize embedded real-time digital twins for spoofing detection and signal validation.

Some of the benefits of the novel time synchronized distributed embedded control system(s) disclosed herein as applied to power delivery include but are not limited to artificial stiffness, improved control stability, improved power quality, and improved energy efficiency. Artificial stiffness refers to the increase, rather than decrease in system stability as the percentage of power delivered (e.g. to the grid or power bus) from power electronics sources increases. This makes it possible to eventually achieve 100% renewable energy production by applying the time synchronization techniques disclosed herein to power delivery system and power delivery devices. In addition, increasing the number of power electronics sources simultaneously improves grid stability and resiliency when implemented using the time synchronization methods and systems described herein Improved energy efficiency can be demonstrated by the value of the Circulating Power (unintended Reactive Power) which equals $V1*\sin(\delta)*V2*\sin(\delta)*\sqrt{2}/(2\pi f*(L1+L2))$, where the phase-angle difference between the two voltage vectors (corresponding to two different power delivery devices coupled in the power delivery system) is represented as $\pi$, L1 and L2 represent the output inductance of each inverter (corresponding to the two different power delivery devices), V1 and V2 are the RMS values of the AC output voltage (corresponding to the two different power delivery devices), and f is the frequency of the power grid (typically 50 or 60 Hz). It is worth noting that unintended reactive power may sometimes be considered worse than circulating real power because reactive power can shift the phase angle, thereby creating destabilizing positive feedback. Thus, with prior art inverter control schemes, 0.5 milliseconds of phase uncertainty on the grid angle can result in 20% of the rated power of the inverters being circulated unintentionally between the inverters, which can destabilize the local grid. In contrast, according to embodiments of the control systems and methods disclosed herein, the unintended circulating power may be reduced to 0.000003% of the rated power.

In general, small phase misalignments/disagreements between the inverters may result in large amounts of undesirable circulating power between them. By way of example, on a 480 VAC Microgrid, 0.5 ms of phase uncertainty (9 degrees for a 50 Hz grid) between two 480 VAC inverters may result in 10 kVAR of unintended circulating (reactive) power between the inverters. For 50 kW inverters, this represents 20% of their rated power being exchanged unintentionally due to the phase uncertainty. This unintended reactive power may also destabilize the phase angle of the local grid (positive reactive power can increase frequency while negative reactive power can decrease frequency depending on the impedance of the microgrid), which may further exacerbate the phase angle calculation of an analog PLL (creating a positive feedback cycle in the control), which may culminate in complete destabilization. On the other hand, when employing embodiments of the TSN disclosed herein to share the grid phase in the above referenced exemplary system, each inverters' phase uncertainty may be reduced to +/−100 nanoseconds. The total worst case phase uncertainty between the inverters may be +/−200 ns.

As also previously mentioned, communications between the power delivery devices may take place over any suitable communications network, e.g. Ethernet or cellular communications or Wi-Fi communications, etc. as may be applicable. Communications between the power delivery devices may take place periodically, or according to any desired timing schedule. Furthermore, synchronization between the various power delivery devices may be achieved through any of the previously described time synchronization methods and/or it may rely on global positioning system (GPS) information.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A distributed control system comprising:
a communication link mechanism;
two or more control devices coupled to the communication link mechanism, wherein each of the two or more control devices is configured to:
time synchronize to other control devices of the two or more control devices through a time synchronization link mechanism;
receive, via the communication link mechanism and according to the time synchronization link mechanism, time-locked alignment information corresponding to two or more operating characteristics controlled by the control device; and
control the two or more operating characteristics according to the received time-locked alignment information and a time-locked instantaneous interpolation mechanism.

2. The distributed control system of claim 1, wherein the two or more operating characteristics comprise two or more of the following:
phase angle of a signal controlled by the control device;
frequency of the signal; or
amplitude of the signal.

3. The distributed control system of claim 1, wherein each of the two or more control devices is comprised in a respective inverter configured to deliver power to a power grid;
wherein the two or more operating characteristics comprise characteristics of an output signal generated by the inverter as a means of delivering the power to the power grid.

4. The distributed control system of claim 3, wherein each respective inverter is configured to deliver power sourced by a non-synchronous power source.

5. The distributed control system of claim 4, wherein the non-synchronous power source comprises of one of the following:
photovoltaic (solar) panels;
wind turbines; or
energy storage element.

6. The distributed control system of claim 1, wherein each of the two or more control devices is further configured to receive, via the communication link mechanism, one or more of the following:
updates of the time-locked alignment information at specific points in time; or
timestamped history that enables the time-locked instantaneous interpolation mechanism to supply specific targeted time-locked information based on time.

7. The distributed control system of claim 6, wherein the specific points in time occur according to defined time intervals.

8. The distributed control system of claim 1, wherein each of the two or more control devices is configured to receive the time-locked alignment information from another one of the two or more control devices at defined time intervals.

9. The distributed control system of claim 1, wherein the communication link mechanism comprises a time-scheduled data communication connection.

10. A control device comprising:
a communication interface for communicating with other control devices according to a communication link mechanism; and
a processing element configured to:
time synchronize to the other control devices through a time synchronization link mechanism;

receive, via the communication interface and according to the time synchronization link mechanism, time-locked alignment information corresponding to two or more operating characteristics controlled by the control device; and control the two or more operating characteristics according to the received time-locked alignment information and a predictive algorithm which, when executed by the control device, supplies targeted time-locked alignment information based on time.

11. The control device of claim 10, wherein the two or more operating characteristics comprise two or more of the following:

phase angle of a signal controlled by the control device;
frequency of the signal; or
amplitude of the signal.

12. The control device of claim 10, wherein the control device is comprised in an inverter configured to deliver power to a power grid, and wherein the two or more operating characteristics comprise characteristics of an output signal generated by the inverter as a means of delivering the power to the power grid.

13. The control device of claim 12, wherein the inverter is configured to deliver power sourced by a non-synchronous power source.

14. The control device of claim 10, wherein the control device is further configured to receive, via the communication interface, one or more of the following:

updates of the time-locked alignment information at specific points in time; or timestamped history used by the predictive algorithm, when executed by the control device, to supply the targeted time-locked alignment information.

15. The control device of claim 10, wherein the control device is configured to receive the time-locked alignment information from one of the other control devices at defined time intervals.

16. A power inverter comprising:

a grid interface for coupling to a power grid for delivering respective power to the power grid;

a communication interface for communicating with other power inverters according to a communication link mechanism; and a processing element configured to:

time synchronize to the other power inverters through a time synchronization link mechanism;

receive, via the communication interface and according to the time synchronization link mechanism, time-locked alignment information corresponding to two or more operating characteristics of the power inverter; and control the two or more operating characteristics according to the received time-locked alignment information and a predictive algorithm which, when executed by the processing element, supplies targeted time-locked alignment information based on time.

17. The power inverter of claim 16, wherein the two or more operating characteristics comprise two or more of the following:

phase angle of a signal controlled by the processing element and used by the power inverter to deliver the respective power to the grid;

frequency of the signal; or amplitude of the signal.

18. The power inverter of claim 16, further comprising:

an input interface for receiving energy from a non-synchronous power source.

19. The power inverter of claim 16, wherein the power inverter is further configured to receive, via the communication interface, one or more of the following:

updates of the time-locked alignment information at specific points in time; or timestamped history used by the predictive algorithm, when executed by the control device, to supply the targeted time-locked alignment information.

20. The power inverter of claim 16, wherein the power inverter is configured to receive the time-locked alignment information from one of the other power inverters at defined time intervals.

* * * * *